(12) United States Patent
Hadadi et al.

(10) Patent No.: US 11,070,968 B2
(45) Date of Patent: Jul. 20, 2021

(54) SYSTEM, METHOD, AND COMPUTER PROGRAM FOR PROTECTING AGAINST UNINTENTIONAL DELETION OF AN ESIM FROM A MOBILE DEVICE

(71) Applicant: Amdocs Development Limited, Limassol (CY)

(72) Inventors: Matan Hadadi, Rishon Le-Zion (IL); Yuval Yakov Mayron, Natanya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/560,586

(22) Filed: Sep. 4, 2019

(65) Prior Publication Data

US 2021/0067947 A1 Mar. 4, 2021

(51) Int. Cl.
*H04W 8/18* (2009.01)
*H04W 8/20* (2009.01)
*H04W 12/06* (2021.01)
*H04W 60/00* (2009.01)

(52) U.S. Cl.
CPC ............. *H04W 8/183* (2013.01); *H04W 8/20* (2013.01); *H04W 12/06* (2013.01); *H04W 60/00* (2013.01)

(58) Field of Classification Search
None
See application file for complete search history.

(56) References Cited

U.S. PATENT DOCUMENTS

| | | | | |
|---|---|---|---|---|
| 2004/0242209 | A1* | 12/2004 | Kruis | H04W 4/50 455/414.1 |
| 2012/0309344 | A1* | 12/2012 | Ferrazzini | H04M 15/77 455/406 |
| 2016/0044495 | A1 | 2/2016 | Schell et al. | |
| 2018/0248971 | A1 | 8/2018 | Park et al. | |
| 2019/0007826 | A1* | 1/2019 | Wane | H04W 4/24 |
| 2019/0028884 | A1* | 1/2019 | Namiranian | H04M 15/00 |
| 2019/0181901 | A1* | 6/2019 | Namiranian | H04L 9/006 |
| 2020/0252791 | A1* | 8/2020 | Hamblet | H04W 8/18 |

OTHER PUBLICATIONS

International Search Report and Written Opinion from PCT Application No. PCT/IB2020/058201, dated Nov. 19, 2020.

* cited by examiner

*Primary Examiner* — Noel R Beharry
*Assistant Examiner* — Keith Follansbee
(74) *Attorney, Agent, or Firm* — Zilka-Kotab, P.C.

(57) ABSTRACT

A system, method, and computer program are provided for protecting against unintentional deletion of an eSIM from a mobile device. In use, deletion of an eSIM from a mobile device is detected. Additionally, definitions of predefined scenarios indicative of unintentional deletions of eSIMs are accessed. Further, the detected deletion is analyzed, using the definitions, to determine that the detected deletion is unintentional. Still yet, a proactive care action is caused to be performed to address the unintentional deletion of the eSIM from the mobile device.

20 Claims, 8 Drawing Sheets

SYSTEM, METHOD, AND COMPUTER PROGRAM FOR PROTECTING AGAINST UNINTENTIONAL DELETION OF AN ESIM FROM A MOBILE DEVICE

FIELD OF THE INVENTION

The present invention relates to SIM technology, and more particularly to eSIM technology.

BACKGROUND

Traditionally, a subscriber identity module (SIM) card has been integrated with a mobile device for use in identifying and authenticating a subscriber of the mobile device (e.g. to a provider network). In particular, the SIM card securely stores information that identifies and authenticates the subscriber. In the past, SIM cards were physical devices with integrated circuits, and could physically connect and disconnect from the mobile device. Thus, losing or misplacing a SIM card was unlikely as it would require physically removing the SIM card from the mobile device and then losing/misplacing it.

More recently, electronic SIM (eSIM) technology has been introduced to replace the traditional SIM card. eSIM is used for similar purposes as the traditional SIM card, but is digitally integrated with the mobile device, for example as computer code or a software application installed on the mobile device. The eSIM need not be removed from the mobile device, since it can support multiple different subscriber accounts (e.g. to different provider networks) and can activate any of the different subscriber accounts at any given time.

However, due to the digital nature of eSIM technology, an eSIM is at risk of unintended (e.g. accidental) deletion thereof from a mobile device. For example, an eSIM can be unintentionally deleted from a mobile device by deleting a software application from the mobile device that represents the eSIM. As the connectivity identity of mobile device users is valuable with regards to enabling network connectivity for the mobile device, there is a need to provide protection from unintentional deletion of an eSIM from a mobile device.

There is thus a need for addressing these and/or other issues associated with the prior art.

SUMMARY

As described herein, a system, method, and computer program are provided for protecting against unintentional deletion of an eSIM from a mobile device. In use, deletion of an eSIM from a mobile device is detected. Additionally, definitions of predefined scenarios indicative of unintentional deletions of eSIMs are accessed. Further, the detected deletion is analyzed, using the definitions, to determine that the detected deletion is unintentional. Still yet, a proactive care action is caused to be performed to address the unintentional deletion of the eSIM from the mobile device.

DETAILED DESCRIPTION

Figure 1:
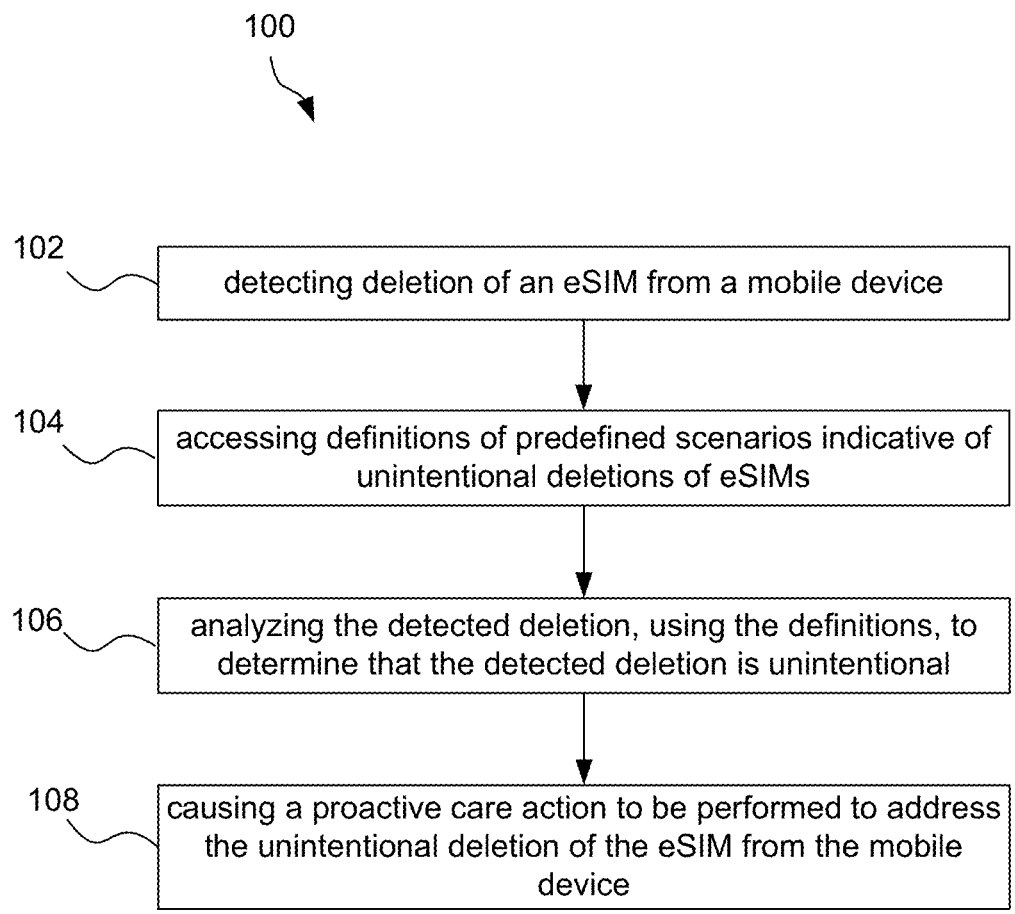
FIG. 1 illustrates a method for protecting against unintentional deletion of an eSIM from a mobile device, in accordance with an embodiment.

FIG. 1 illustrates a method 100 for protecting against unintentional deletion of an eSIM from a mobile device, in accordance with one embodiment. The method 100 may be implemented in the context of any computer system, such as the exemplary system 700 of FIG. 7. In an embodiment, the method 100 may be performed by the mobile device. The mobile device may be a mobile phone, tablet, laptop, or any other mobile user device. In another embodiment, the method 100 may be performed by a platform running separately from the mobile device, such as a platform running on a cloud server(s) that is in communication with the mobile device via one or more communication networks.

As shown, in operation 102, deletion of an eSIM from a mobile device is detected. In the context of the present description, the eSIM is an electronic (digital) SIM storing information capable of being used for identifying an authenticating a subscriber of the mobile device to a provider network. For example, the eSIM may securely store identity and authentication information for the subscriber to the provider network, such as an identifier of a subscription account of the subscriber to the provider network. It should be noted that the eSIM may similarly store the aforementioned information for one or more different subscribers of the mobile device to one or more different provider networks.

When the mobile device attempts to connect or otherwise communicate via the provider network, the provider network may access the eSIM to identify and authenticate a subscription of the mobile device to the provider network, as a prerequisite to authorizing the connection/communication. If the eSIM stores identification and authentication information for multiple different subscribers, as noted above, then the provider network may check the identification and authentication information for each subscriber to ensure that at least one of the subscribers is authorized to access the provider network.

In one embodiment the eSIM may be installed as computer code on the mobile device, such as a software application installed on the mobile device. Accordingly, the eSIM may be susceptible to an unintentional deletion by a user of the mobile device. In the context of the present description, unintentional refers to being accidental, unintended, or otherwise unwanted.

Optionally, the deletion of the eSIM from the mobile device may be detected before or after the eSIM is actually removed from the mobile device, depending on the configuration of the method 100. For example, in one embodiment, the deletion of the eSIM from the mobile device may be detected from a command to delete the eSIM from the mobile device. The command may be a user request to delete the eSIM from the mobile device, such as user selection of an icon representing the eSIM in combination with user selection of a delete key on the mobile device. In another embodiment, the deletion of the eSIM from the mobile device may be detected from an event indicating a removal of the eSIM from the mobile device. The removal may refer to a removal of the eSIM from memory of the mobile device. Optionally, the removal may result from the above described command to delete the eSIM from the mobile device.

In an embodiment where the method 100 is performed by the mobile device, the deletion may directly be detected by the mobile device. In an embodiment where the method 100 is performed by a third party platform, the deletion may be detected from information provided to the platform by the mobile device that indicates the deletion.

Further, as an option, detecting the deletion of the eSIM from the mobile device may include identifying information describing the deletion of the eSIM from the mobile device. The information describing the deletion may include a time of the deletion, a user that caused the deletion, events occurring on the mobile device leading up to the deletion, a location of the mobile device at a time of the deletion, and/or a fee paid for the eSIM. It should be noted that the information may be retrieved from various channels storing the information, such as an original equipment manufacturer (OEM) mobile application, any device, a device local profile assistance (LPA), a store, carrier information technology (IT) such as a business support system (BSS) and/or operations support system (OSS), subscription manager data preparation (SM-DP), and/or an eSIM database.

As still yet another option, detecting the deletion of the eSIM from the mobile device may include identifying registration information for the eSIM. Of course, it should be noted that in other embodiments the registration information may be identified independently of the detection of the deletion of the eSIM from the mobile device, such as at a point in time prior to the detection of the deletion of the eSIM from the mobile device. The registration information may be retrieved, obtained, or otherwise identified from the OEM mobile application, any device, the device LPA, the store, carrier IT such as a BSS and/or OSS, SM-DP, and/or the eSIM database. In accordance with various examples, the registration information may include a time of an activation of the eSIM on the mobile device, a subscription plan for each account associated with the eSIM, and/or a location of the mobile device during the activation of the eSIM on the mobile device.

Next, as shown in operation 104, definitions of predefined scenarios indicative of unintentional deletions of eSIMs are accessed. The predefined scenarios may be manually defined (e.g. by a developer of the method 100) or may be automatically defined, for example by using artificial intelligence applied to historical data relating to unintentional deletions of eSIMs of mobile devices. In any case the definition of each of the predefined scenarios may include any information, criteria, parameters, etc. indicative of an unintentional deletion of eSIMs.

In one embodiment, one or more of the predefined scenarios may be time dependent. For example, a definition of one or more of the predefined scenarios may indicate that a deletion of an eSIM is unintentional when the deletion occurs within a specified time following activation of the eSIM. In another embodiment, one or more of the predefined scenarios may be location dependent. For example, a definition of one or more of the predefined scenarios may indicate that a deletion of an eSIM is unintentional when the deletion occurs within a specified time following the mobile device being taken out of a particular store (e.g. at which the mobile device is purchased).

In yet another embodiment, one or more of the predefined scenarios may be user dependent. For example, a definition of one or more of the predefined scenarios may indicate that a deletion of an eSIM is unintentional when a user of the mobile device at the time of the deletion is identified as being a child (i.e. within a specified age range). In still yet another embodiment, one or more of the predefined scenarios may be pattern dependent. For example, a definition of one or more of the predefined scenarios may indicate that a deletion of an eSIM is unintentional when a pattern of usage of the device is predetermined to be associated with a unintentional deletion of the eSIM.

In a further embodiment, one or more of the predefined scenarios may be experience dependent. For example, a definition of one or more of the predefined scenarios may indicate that a deletion of an eSIM is unintentional when the deletion occurs following an experience (i.e. series of actions) of a user of the mobile device that is predetermined to be associated with a unintentional deletion of the eSIM. The experience may be a complex process, such as signing up for a credit card, for example. In another embodiment, one or more of the predefined scenarios may be financial dependent. For example, a definition of one or more of the predefined scenarios may indicate that a deletion of an eSIM is unintentional when the eSIM was installed on the mobile device at no charge. For example, it may be predetermined that when a user obtains an eSIM at no charge (for free), then the user may have no reason to delete the eSIM.

It should be noted that these embodiments are not exclusive of one another, but may be used in combination to define scenarios with multiple different parameters, etc. that indicate unintentional deletions of eSIMs. As noted above in operation 104, the definitions of the predefined scenarios are accessed. In one embodiment, the definitions may be stored locally, and thus accessed locally (e.g. in local memory). In another embodiment, the definitions may be stored remotely, and thus accessed remotely (e.g. over a network). Moreover, the definitions may be accessed responsive to operation 102, namely the detection of the deletion of the eSIM from the mobile device.

Further, as shown in operation 106, the detected deletion is analyzed, using the definitions, to determine that the detected deletion is unintentional. For example, the analysis may include determining that the detected deletion meets, matches, etc. at least one of the definitions indicative of unintentional deletions of eSIMs, and thereby determining that the detected deletion is unintentional.

In one embodiment, the analysis may also take into consideration the information describing the deletion of the eSIM from the mobile device. For example, analyzing the detected deletion, using the definitions, to determine that the detected deletion is unintentional may include determining that the information describing the deletion of the eSIM from the mobile device correlates with one or more of the definitions. In another embodiment, the analysis may similarly take into consideration the registration information for the eSIM.

Still yet, as shown in operation 108, a proactive care action is caused to be performed to address the unintentional deletion of the eSIM from the mobile device. In an embodiment where the method 100 is performed by the mobile device, the proactive care action may be performed by the mobile device alone or in combination with other devices/systems. In an embodiment where the method 100 is performed by the platform, the platform may cause the proactive care action to be performed by the mobile device alone or in combination with other devices/systems.

As noted above, the deletion of the eSIM from the mobile device may be detected before or after the eSIM is actually removed from the mobile device, depending on the configuration of the method 100. Accordingly, the proactive care action that is performed may depend on whether the method 100 is configured to detect a command to delete the eSIM from the mobile device or is configured to detect an event indicating a removal of the eSIM from the mobile device.

For example, when the detecting the deletion of the eSIM from the mobile device includes detecting a command to delete the eSIM from the mobile device, then the proactive care action may include at least temporarily preventing deletion of eSIM from the mobile device. In this example, the proactive care action may include providing a notification on the mobile regarding the commanded deletion, and optionally requiring the user to confirm the deletion through additional input (e.g. an additional button click) before removing the eSIM from the device. Alternatively, in this example, the proactive care action may include providing a notification through a channel separate from the mobile device (e.g. to another mobile device) regarding the commanded deletion, and optionally requiring the user to confirm the deletion through additional input (e.g. an additional button click) before removing the eSIM from the device. As yet another option, the proactive care action may include returning an error and preventing the eSIM from being removed from the mobile device regardless of further user input.

As another example, when the detecting the deletion of the eSIM from the mobile device includes detecting an event indicating a removal of the eSIM from the mobile device, then the proactive care action may include downloading a copy of the eSIM to the mobile device. The downloading may occur automatically without user intervention. Alternatively, the downloading may occur in response to notifying the user of the mobile device of the deletion (e.g. through the mobile device or through a channel separate from the mobile device), and receiving input from the user to download the copy of the eSIM.

To this end, the method 100 may implement the proactive care action to provide protection against unintentional deletion of the eSIM from the mobile device. This method 100 may help ensure that the eSIM continues to be available to the mobile device for its intended purpose (i.e. network connectivity). The method 100 may further prevent mobile device users from having to initiate a care action on their own accord (e.g. making a call to customer service for the provider network).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
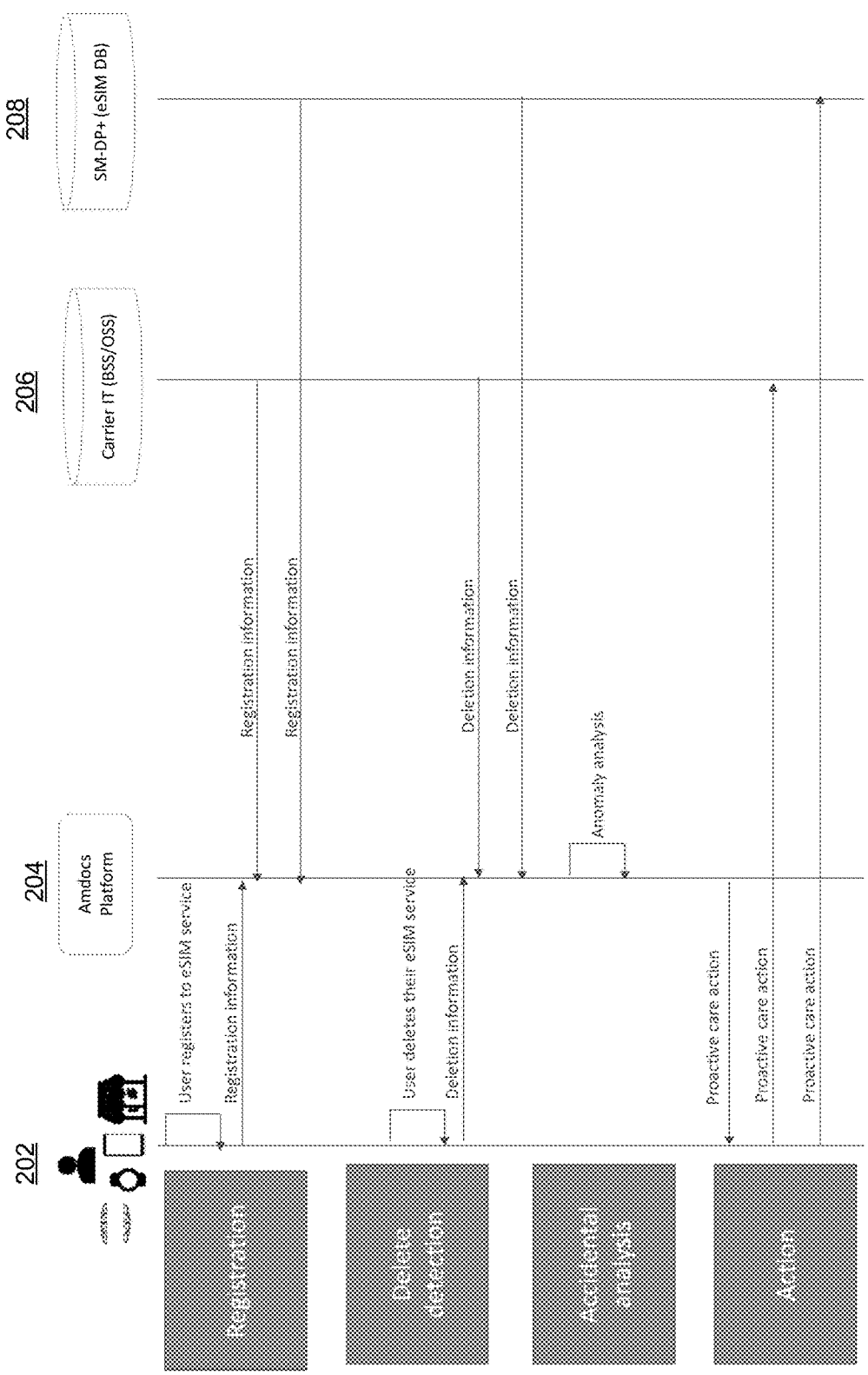
FIG. 2 illustrates a system flow diagram for protecting against unintentional deletion of an eSIM from a mobile device, in accordance with an embodiment.

FIG. 2 illustrates a system flow diagram for protecting against unintentional deletion of an eSIM from a mobile device, in accordance with an embodiment. As an option, the system flow diagram may be implemented in the context of the details of the previous figure and/or any subsequent figure(s). Of course, however, the flow diagram may be implemented in the context of any desired environment.

As shown, a user, through one of a plurality of possible communication channels, registers (e.g. activates) an eSIM for a mobile device 202. Registering the eSIM may include requesting the eSIM from a network provider, completing an authorization process for the user (e.g. creating a user account with the network provider, validating an existing account with the network provider, etc.), and receiving the eSIM from the network provider at the mobile device 202 for use in accessing a network of the network provider. The registration process may be performed with the network provider or with a third party platform 204 capable of being used for protecting against unintentional deletion of the eSIM from the mobile device 202. The third party platform 204 may include a combination of hardware (e.g. servers) and software (e.g. applications) that is in communication with the mobile device 202 and other communication channels described below.

It should be noted that the possible communication channels are each capable of registering the eSIM for the mobile device 202, and may be managed by the network provider or by the platform 204. In various examples, the possible communication channels may include a website, an application installed on a mobile device, a retail (physical) store, etc.

Once registered, registration information is sent from the mobile device 202 (or optionally the communication channel used to register the eSIM) to the platform 204. The registration information may include an identifier of the mobile device 202, an identifier of the eSIM registered for the mobile device 202, etc. The platform 204 retrieves additional registration information from other channels as well, such as an OEM mobile application (not shown), any device (not shown), a device LPA (not shown), a store (not shown), a carrier IT (with BSS/OSS) 206, SM-DP (with eSIM database) 208, etc. In accordance with various examples, the registration information may include a time of the registration of the eSIM on the mobile device 202, a subscription plan for each account associated with the eSIM, and/or a location of the mobile device 202 during the registration of the eSIM for the mobile device.

At some point in time after the registration of the eSIM for the mobile device 202, a deletion of the eSIM from the mobile device 202 is detected. The deletion may be detected by software running on the mobile device 202, in one embodiment. The deletion may include only a request or command to remove the eSIM from the mobile device 202, or may be an actual removal of the eSIM from the mobile device 202. Optionally, the software may be an application installed on the mobile device 202 (e.g. by the platform 204), optionally as part of the registration of the eSIM for the mobile device 202.

As shown, responsive to the detection of the deletion of the eSIM from the mobile device 202, deletion information is sent from the mobile device 202 to the platform 204. The software used to detect the deletion may similarly be used to send the deletion information to the platform 204. Thus, the software may be configured to interface the platform 204. The deletion information may include any information describing the deletion, such as a time of the deletion, a user logged into or otherwise determined to be using the mobile device 202 at a time of the deletion, a location of the mobile device 202 at a time of the deletion, a usage (i.e. action by the user) of the mobile device 202 leading up to the deletion, an experience (i.e. series of actions) of a user of the mobile device 202 prior to the deletion.

Further, additional deletion information is also identified by the platform 204 from the other channels (e.g. the carrier IT (with BSS/OSS) 206, SM-DP (with eSIM database) 208, etc.). The additional deletion information may include a price paid for the eSIM, an identification of a user that registered the eSIM for the mobile device 202, or any other category of information that is predefined by the platform 204 as being useful in the subsequent analysis to determine whether the deletion was unintentional.

Accordingly, once the deletion information and additional deletion information is obtained by the platform 204, the platform 204 analyzes the same to determine whether the deletion was unintentional. This analysis may be performed using definitions of predefined scenarios indicative of unintentional deletions of eSIMs, and further optionally using the registration information and the additional registration information. For example, if the deletion information and additional deletion information meets the criteria of any of the definitions, then it may be determined that the deletion was unintentional.

In the present embodiment shown, the deletion is determined by the platform 204 to be unintentional. In response, the platform 204 causes a proactive care action to be performed on the mobile device 202. The proactive care action can include any action to protect against the unintentional deletion of the eSIM on the mobile device 202, as described in further detail in the remaining FIGS. 3-5 below. The proactive care action may be performed solely by the mobile device 202 (e.g. the software running on the mobile device), or may be performed by the mobile device 202 with assistance from the other channels (e.g. the carrier IT (with BSS/OSS) 206, SM-DP (with eSIM database) 208, etc.), again as described in further detail in the remaining FIGS. 3-5 below.

Figure 3:
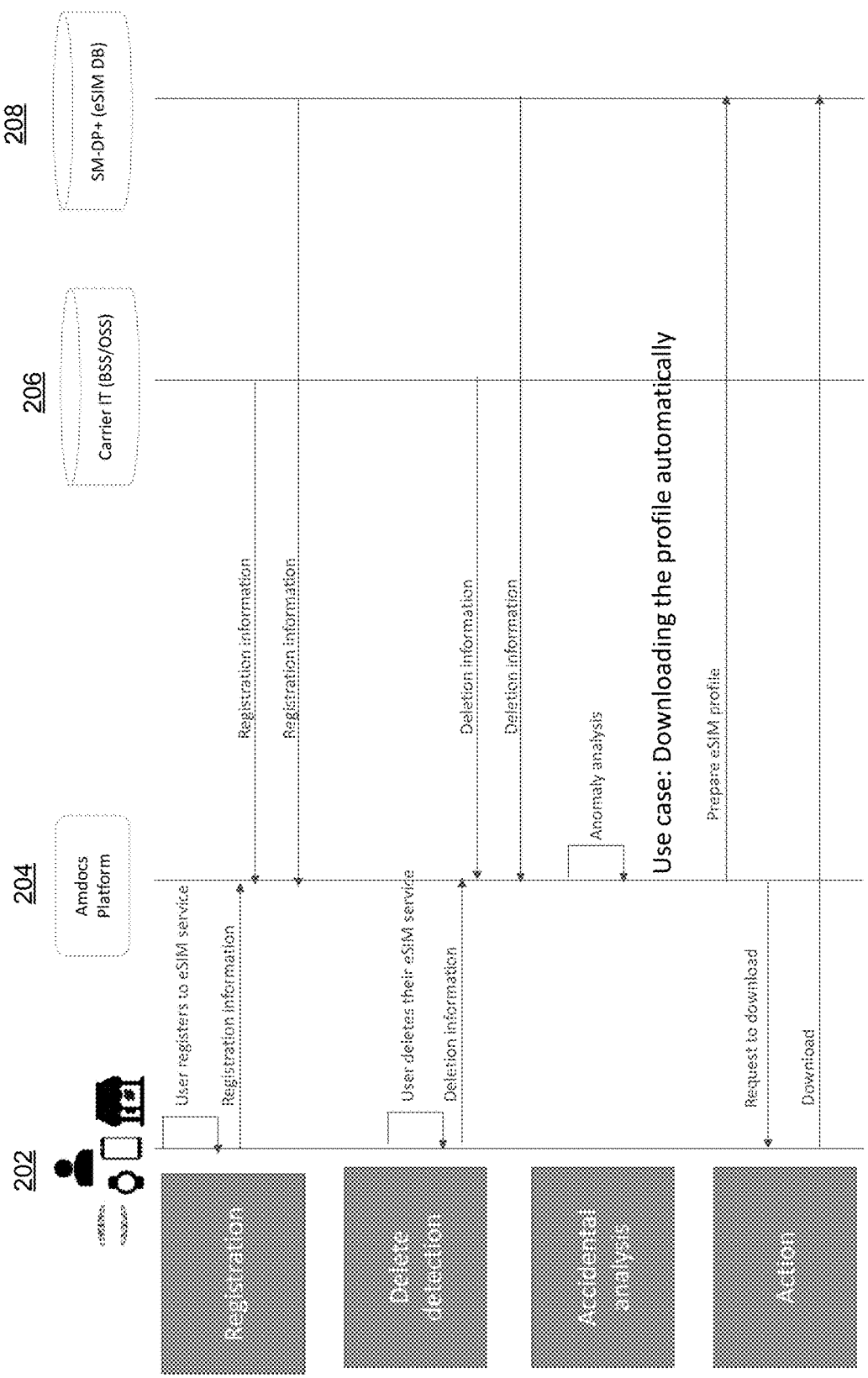
FIG. 3 shows a system flow diagram for protecting against unintentional deletion of an eSIM from a mobile device by downloading a copy of an unintentionally deleted eSIM to the mobile device, in accordance with an embodiment.

FIG. 3 shows a system flow diagram for protecting against unintentional deletion of an eSIM from a mobile device by downloading a copy of an unintentionally deleted eSIM to the mobile device, in accordance with an embodiment. As an option, the system flow diagram may be implemented in the context of the details of the previous figure and/or any subsequent figure(s). Of course, however, the flow diagram may be implemented in the context of any desired environment.

The system flow diagram of FIG. 3 follows the same sequence of events as described above with reference to FIG. 2, with a more specific use case of the proactive care action performed by the mobile device 202. As shown, the platform 204 causes the mobile device 202 to download a copy of the unintentionally deleted eSIM.

In particular, in response to a determination that a deletion (i.e. an actual removal in this case) of the eSIM from the mobile device 202 was unintentional, the platform 204 instructs the SM-DP (with eSIM database) 208 to prepare the eSIM copy for the mobile device 202. The platform 204 then requests the mobile device 202 to download the copy of the eSIM from the SM-DP (with eSIM database) 208. In response to the request, the mobile device 202 downloads the copy of the eSIM from the SM-DP (with eSIM database) 208. The download may be performed automatically (e.g. by the software) without user intervention.

Figure 4:
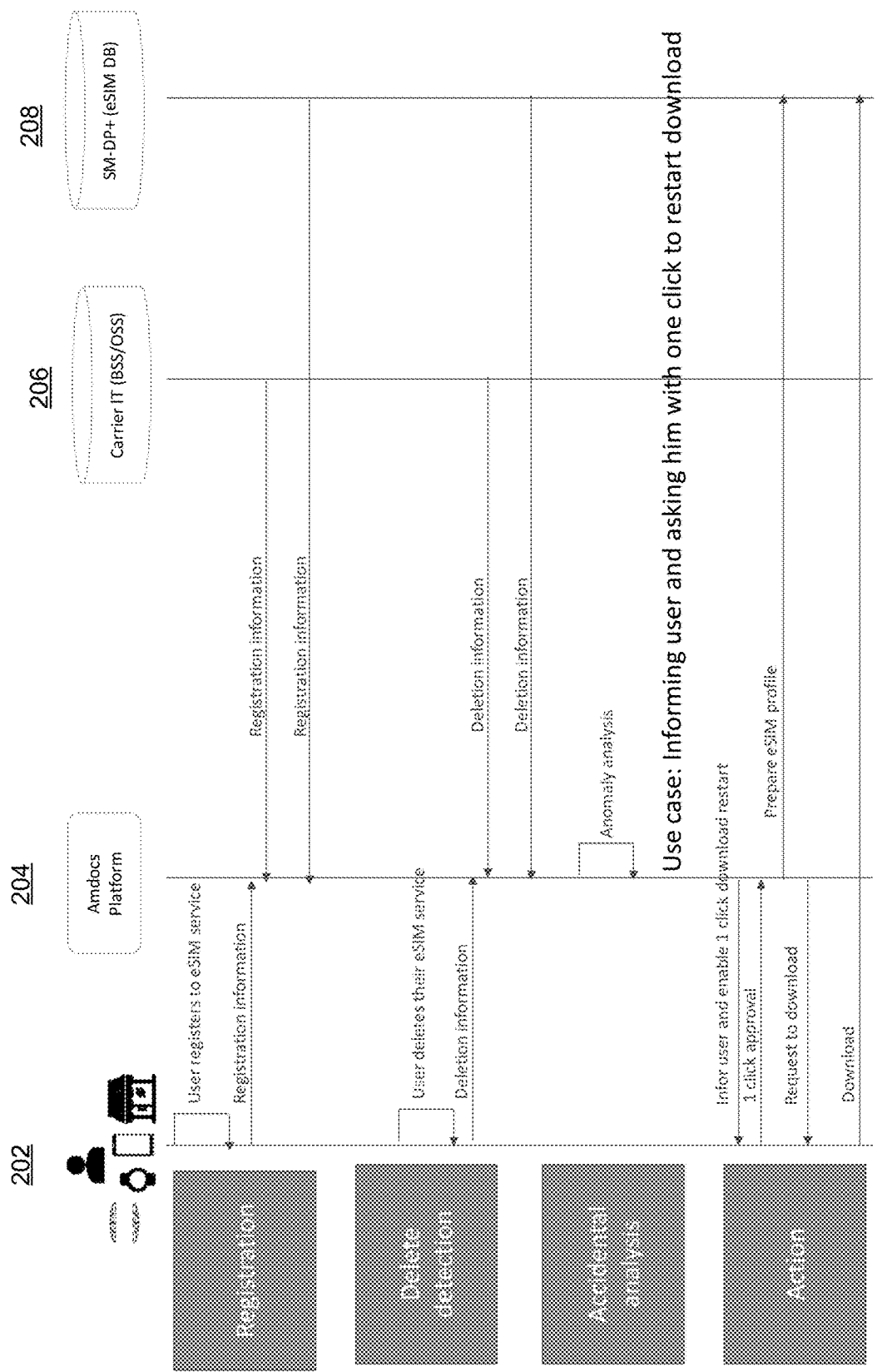
FIG. 4 shows a system flow diagram for protecting against unintentional deletion of an eSIM from a mobile device by providing an alert on the mobile device and an option for a user of the mobile device to download a copy of an unintentionally deleted eSIM to the mobile device, in accordance with an embodiment.

FIG. 4 shows a system flow diagram for protecting against unintentional deletion of an eSIM from a mobile device by providing an alert on the mobile device and an option for a user of the mobile device to download a copy of an unintentionally deleted eSIM to the mobile device, in accordance with an embodiment. As an option, the system flow diagram may be implemented in the context of the details of the previous figure and/or any subsequent figure(s). Of course, however, the flow diagram may be implemented in the context of any desired environment.

The system flow diagram of FIG. 4 follows the same sequence of events as described above with reference to FIG. 2, with a more specific use case of the proactive care action performed by the mobile device 202. As shown, the platform 204 causes the mobile device 202 to issue an alert and provide an option for a user of the mobile device 202 to download a copy of an unintentionally deleted eSIM to the mobile device 202.

In particular, in response to a determination that a deletion (i.e. an actual removal in this case) of the eSIM from the mobile device 202 was unintentional, the platform 204 instructs the mobile device 202 to display an alert (i.e. indicating the removal of the eSIM) along with an option for a user of the mobile device 202 to download a copy of the unintentionally deleted eSIM to the mobile device 202. The option may be a selectable button displayed on the mobile device 202. Thus, the user may verify that the deletion was unintentional by not selecting the option and closing the alert, or may verify that the deletion was unintentional by selecting the option.

Responsive to the user selecting the option, the platform 204 instructs the SM-DP (with eSIM database) 208 to prepare the eSIM copy for the mobile device 202. The platform 204 then requests the mobile device 202 to download the copy of the eSIM from the SM-DP (with eSIM database) 208. In response to the request, the mobile device 202 downloads the copy of the eSIM from the SM-DP (with eSIM database) 208. Thus, the download may be performed only in response to user intervention.

Figure 5:
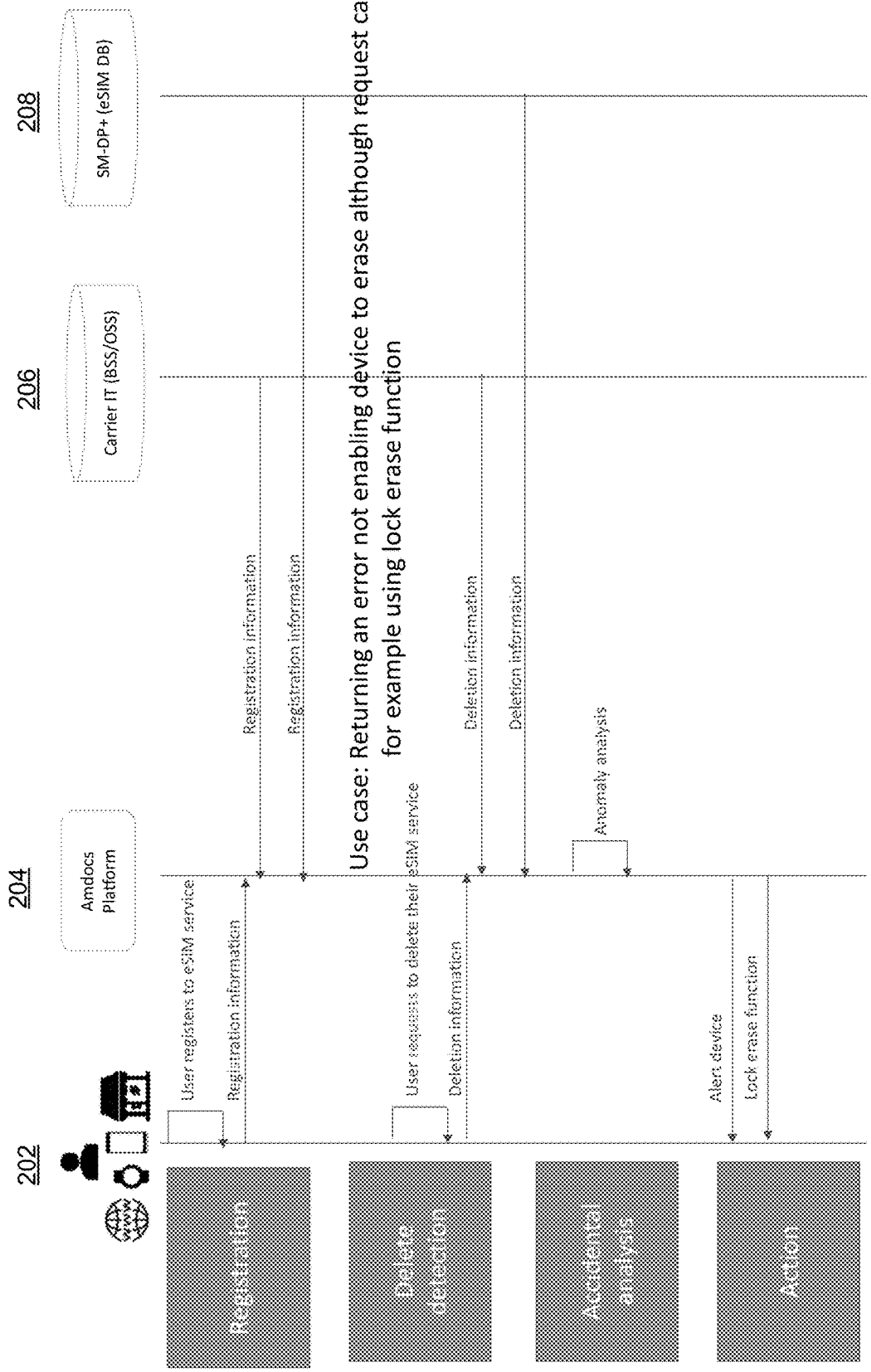
FIG. 5 shows a system flow diagram for protecting against unintentional deletion of an eSIM from a mobile device by providing an alert on the mobile device and preventing removal of the eSIM from the mobile device, in accordance with an embodiment.

FIG. 5 shows a system flow diagram for protecting against unintentional deletion of an eSIM from a mobile device by providing an alert on the mobile device and preventing removal of the eSIM from the mobile device, in accordance with an embodiment. As an option, the system flow diagram may be implemented in the context of the details of the previous figure and/or any subsequent figure(s). Of course, however, the flow diagram may be implemented in the context of any desired environment.

The system flow diagram of FIG. 5 follows the same sequence of events as described above with reference to FIG. 2, with a more specific use case of the proactive care action performed by the mobile device 202. As shown, the platform 204 causes the mobile device 202 to issue an alert and prevent removal of the eSIM from the mobile device.

In particular, in response to a determination that a deletion (i.e. a requested removal in this case without actual removal) of the eSIM from the mobile device 202 was unintentional, the platform 204 instructs the mobile device 202 to display an alert (e.g. indicating the requested removal of the eSIM, indicating an error for the requested removal, etc.). The platform 204 further instructs the mobile device 202 to lock an erase function with respect to the eSIM, such that the eSIM cannot be removed from the mobile device 202.

Figure 6:
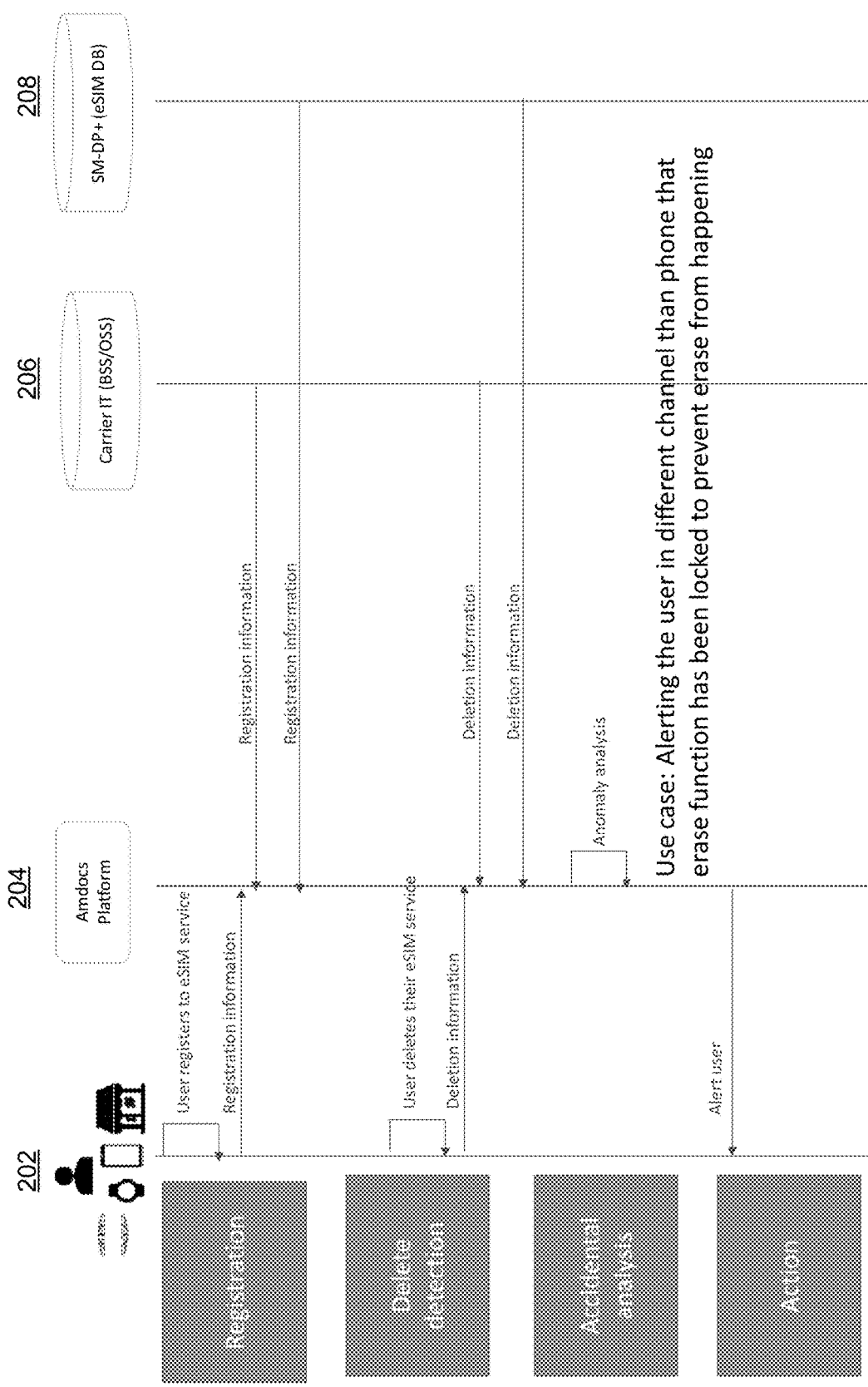
FIG. 6 shows a system flow diagram for protecting against unintentional deletion of an eSIM from a mobile device by providing an alert through a channel separate from the mobile device, in accordance with an embodiment.

FIG. 6 shows a system flow diagram for protecting against unintentional deletion of an eSIM from a mobile device by providing an alert through a channel separate from the mobile device, in accordance with an embodiment. As an option, the system flow diagram may be implemented in the context of the details of the previous figure and/or any subsequent figure(s). Of course, however, the flow diagram may be implemented in the context of any desired environment.

The system flow diagram of FIG. 6 follows the same sequence of events as described above with reference to FIG. 2, with a more specific use case of the proactive care action performed by the mobile device 202. As shown, the platform 204 causes the mobile device 202 to issue an alert that is provided through a channel separate from the mobile device 202.

In particular, in response to a determination that a deletion (i.e. a requested removal in this case without actual removal) of the eSIM from the mobile device 202 was unintentional, the platform 204 instructs a channel separate from the mobile device 202 to issue an alert (e.g. indicating the requested removal of the eSIM, indicating an error for the requested removal, etc.). For example, the platform 204 may instruct another mobile device of the user to display the alert, may instruct a short message service (SMS) message to be provided to the user, may instruct a call to be made to a network provider call center, etc. Optionally, the platform 204 may also instruct the mobile device 202 to lock an erase function with respect to the eSIM, such that the eSIM cannot be removed from the mobile device 202.

Figure 7:
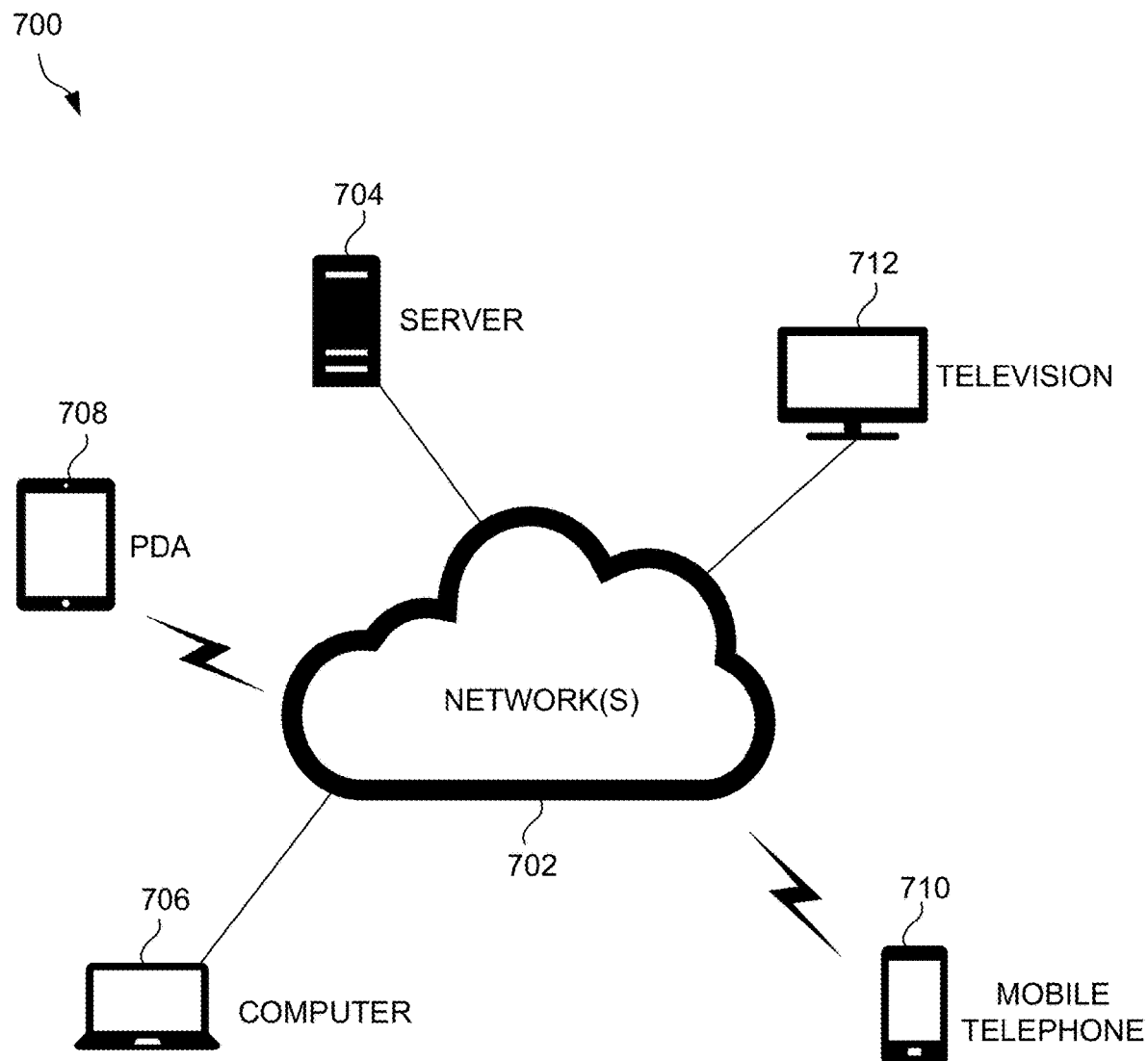
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
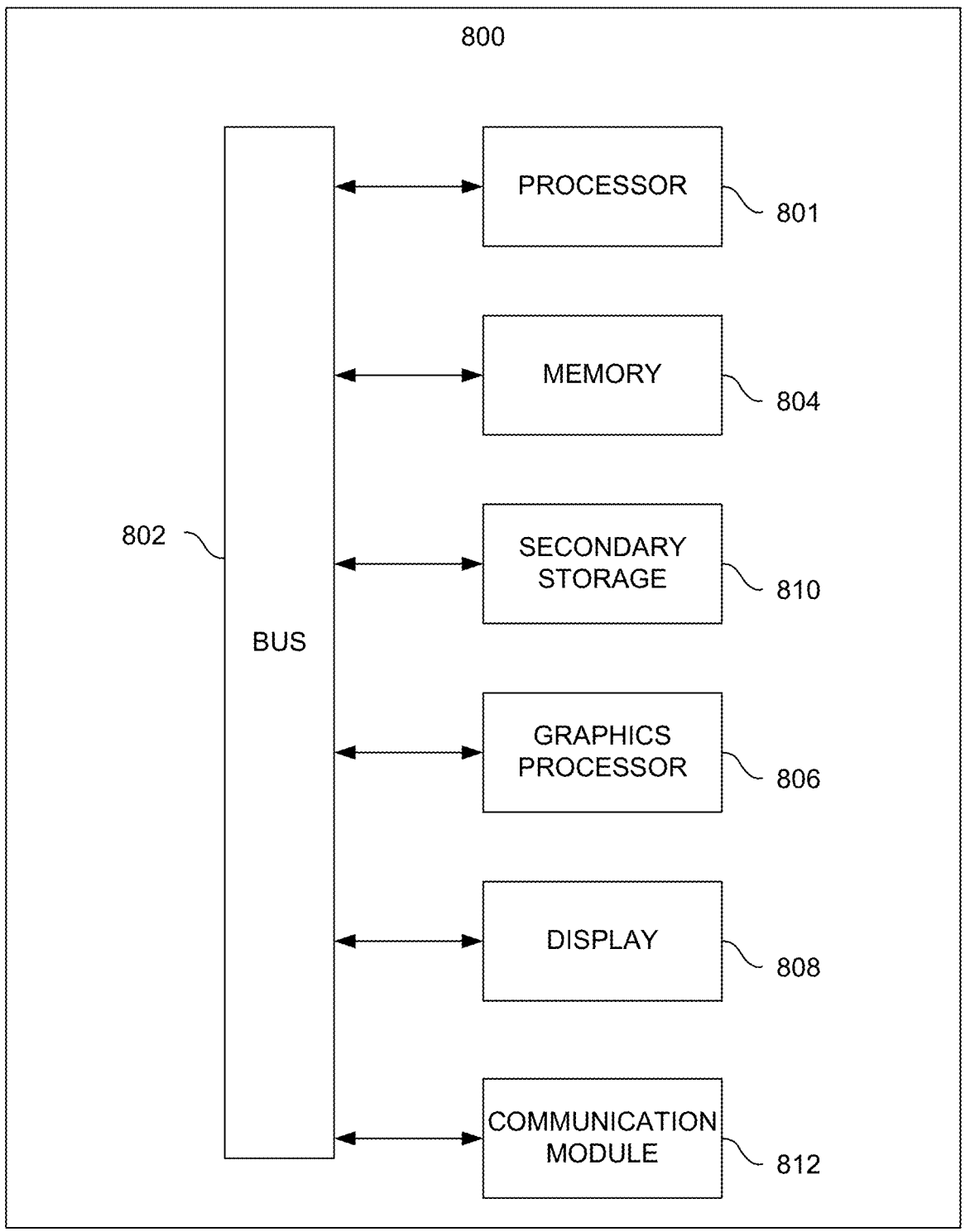
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising: detecting deletion of an electronic subscriber identity module (eSIM) from a mobile device, accessing definitions of predefined scenarios indicative of unintentional deletions of eSIMs, wherein the predefined scenarios are automatically defined by using artificial intelligence applied to historical data relating to unintentional deletions of eSIMs of mobile devices; analyzing the detected deletion, using the definitions, to determine that the detected deletion is unintentional; and causing a proactive care action to be performed to address the unintentional deletion of the eSIM from the mobile device.

2. The non-transitory computer readable medium of claim 1, wherein the method is performed by the mobile device.

3. The non-transitory computer readable medium of claim 1, wherein the method is performed by a platform running separately from the mobile device.

4. The non-transitory computer readable medium of claim 1, wherein the eSIM is installed as computer code on the mobile device.

5. The non-transitory computer readable medium of claim 1, wherein the eSIM securely stores identity and authentication information for at least one subscriber to a provider network.

6. The non-transitory computer readable medium of claim 1, wherein detecting the deletion of the eSIM from the mobile device includes detecting a command to delete the eSIM from the mobile device or detecting an event indicating a removal of the eSIM from the mobile device.

7. The non-transitory computer readable medium of claim 1, wherein detecting the deletion of the eSIM from the mobile device includes identifying information describing the deletion of the eSIM from the mobile device.

8. The non-transitory computer readable medium of claim 7, wherein the information describing the deletion of the eSIM from the mobile device includes at least one of: a time of the deletion, a user that caused the deletion, events occurring on the mobile device leading up to the deletion, a location of the mobile device at a time of the deletion, or a fee paid for the eSIM.

9. The non-transitory computer readable medium of claim 7, wherein analyzing the detected deletion, using the definitions, to determine that the detected deletion is unintentional includes determining that the information describing the deletion of the eSIM from the mobile device correlates with one or more of the definitions.

10. The non-transitory computer readable medium of claim 1, wherein the definitions are stored locally.

11. The non-transitory computer readable medium of claim 1, wherein detecting the deletion of the eSIM from the mobile device includes identifying registration information for the eSIM.

12. The non-transitory computer readable medium of claim 11, wherein the registration information includes at least one of: a time of an activation of the eSIM on the mobile device, a subscription plan for each account associated with the eSIM, or a location of the mobile device during the activation of the eSIM on the mobile device.

13. The non-transitory computer readable medium of claim 12, wherein the analyzing is further of the registration information.

14. The non-transitory computer readable medium of claim 1, wherein when the detecting the deletion of the eSIM from the mobile device includes detecting a command to delete the eSIM from the mobile device, then the proactive care action includes at least temporarily preventing deletion of eSIM from the mobile device.

15. The non-transitory computer readable medium of claim 1, wherein when the detecting the deletion of the eSIM from the mobile device includes detecting an event indicating a removal of the eSIM from the mobile device, then the proactive care action includes downloading a copy of the eSIM to the mobile device automatically without user intervention.

16. The non-transitory computer readable medium of claim 1, wherein at least one definition of the definitions of predefined scenarios indicates that a deletion of an eSIM from a mobile device is unintentional when the deletion occurs within a specified time following activation of the eSIM on the mobile device.

17. The non-transitory computer readable medium of claim 1, wherein at least one definition of the definitions of predefined scenarios indicates that a deletion of an eSIM from a mobile device is unintentional when a user of the mobile device at the time of the deletion is identified as being within a specified age range.

18. The non-transitory computer readable medium of claim 1, wherein at least one definition of the definitions of predefined scenarios indicates that a deletion of an eSIM from a mobile device is unintentional when the eSIM was installed on the mobile device at no charge.

19. A method comprising: detecting, by a system, deletion of an electronic subscriber identity module (eSIM) from a mobile device; accessing, by the system, definitions of predefined scenarios indicative of unintentional deletions of eSIMs; analyzing, by the system, the detected deletion, using the definitions, to determine that the detected deletion is unintentional, wherein the predefined scenarios are automatically defined by using artificial intelligence applied to historical data relating to unintentional deletions of eSIMs of mobile devices; and causing, by the system, a proactive care action to be performed to address the unintentional deletion of the eSIM from the mobile device.

20. A system, comprising: a non-transitory memory storing instructions; and one or more processors in communication with the non-transitory memory that execute the instructions to perform a method comprising: detecting deletion of an electronic subscriber identity module (eSIM) from a mobile device; accessing definitions of predefined scenarios indicative of unintentional deletions of eSIMs; analyzing the detected deletion, using the definitions, to determine that the detected deletion is unintentional, wherein the predefined scenarios are automatically defined by using artificial intelligence applied to historical data relating to unintentional deletions of eSIMs of mobile devices; and causing a proactive care action to be performed to address the unintentional deletion of the eSIM from the mobile device.

* * * * *

UNITED STATES PATENT AND TRADEMARK OFFICE
CERTIFICATE OF CORRECTION

| | |
|---|---|
| PATENT NO. | : 11,070,968 B2 |
| APPLICATION NO. | : 16/560586 |
| DATED | : July 20, 2021 |
| INVENTOR(S) | : Matan Hadadi et al. |

It is certified that error appears in the above-identified patent and that said Letters Patent is hereby corrected as shown below:

In the Claims

Column 12, Line 9, Claim 1 please replace "device," with --device;--

Signed and Sealed this
Thirteenth Day of January, 2026

John A. Squires
*Director of the United States Patent and Trademark Office*